(12) United States Patent
Wang et al.

(10) Patent No.: US 6,226,704 B1
(45) Date of Patent: May 1, 2001

(54) METHOD AND APPARATUS FOR PERFORMING BUS TRANSACTIONS ORDERLY AND CONCURRENTLY IN A BUS BRIDGE

(75) Inventors: Wan-Kuang Wang; Wen-Hsiang Lin; Michael T. H. Chen, all of Hsinchu (TW)

(73) Assignee: Silicon Integrated Systems Corporation, Hsinchu (TW)

( * ) Notice: Subject to any disclaimer, the term of this patent is extended or adjusted under 35 U.S.C. 154(b) by 0 days.

(21) Appl. No.: 09/201,993

(22) Filed: Dec. 1, 1998

(51) Int. Cl.$^7$ .......................... G06F 13/42; G06F 13/40; G06F 13/00
(52) U.S. Cl. .................... 710/129; 710/128; 710/107; 709/100; 370/402
(58) Field of Search ................................ 710/129, 107, 710/240, 2, 101, 112, 126, 128, 36, 52, 56.36, 113, 242, 105; 709/100; 711/100; 340/825.06; 370/402, 413, 462

(56) References Cited

U.S. PATENT DOCUMENTS

| 5,761,454 | * | 6/1998 | Adusumilli et al. . |
| 5,768,547 | * | 6/1998 | Ezzet . |
| 5,793,996 | * | 8/1998 | Childers et al. . |
| 5,802,055 | * | 9/1998 | Krien et al. . |
| 5,878,237 | * | 3/1999 | Olarig . |

* cited by examiner

*Primary Examiner*—Gopal C. Ray
(74) *Attorney, Agent, or Firm*—Merchant & Gould P.C.

(57) ABSTRACT

The present invention provides a method and apparatus for performing bus transactions orderly and concurrently in a bus bridge. To meet the ordering rules, the invention adopts a HOLD/HLDA handshaking mechanism to control the flow of transactions in the bus bridge. When both HOLD and HLDA signals are asserted, the bus bridge holds the transaction processed in one direction and then the bus bridge is ready to process the transaction from another direction. That is, the bus bridge first controls the transaction flowing in one direction whenever there is request coming from another direction, wherein the HOLD signal is asserted simultaneously. Upon receipt of the HLDA signal indicating that the transaction flow has been completely held in one direction, the bus bridge allows the transaction to flow from another direction by granting the request agent bus ownership. The present invention also provides a method to avoid deadlock. The bus bridge retries transactions stalling the bus in two cases. First, the bus bridge retries non-postable transactions until the posted transactions in the posting buffers on the same side are completed at the destination. Second, the bus bridge retries postable transactions until the posting buffers on the same side have sufficient spaces to accept transactions.

29 Claims, 4 Drawing Sheets

METHOD AND APPARATUS FOR PERFORMING BUS TRANSACTIONS ORDERLY AND CONCURRENTLY IN A BUS BRIDGE

FIELD OF THE INVENTION

The present invention generally relates to a personal computer, and more particularly, to the bus bridge of a personal computer.

BACKGROUND OF THE INVENTION

Many programming tasks, especially those controlling intelligent peripheral devices common in PCI (Peripheral Component Interconnect) systems, require specific events to occur in a specific order. If the events generated by the program do not occur in the hardware in the order intended by the software, a peripheral device may behave in a totally unexpected way. PCI transaction ordering rules are written to give hardware the flexibility to optimize performance by rearranging certain events which do not affect device operation, yet strictly enforce the order of events that do affect device operation.

One performance optimization that PCI systems are allowed to do is the posting of memory write transactions. Posting means the transaction is captured by an intermediate agent; e.g., a bridge from one bus to another, so that the transaction completes at the source before it actually completes at the intended destination. This allows the source to proceed with the next operation while the transaction is still making its way through the system to its ultimate destination.

While posting improves system performance, it complicates event ordering. Since the source of a write transaction proceeds before the write actually reaches its destination, other events that the programmer intended to happen after the write, may happen before the write. Many of the PCI ordering rules focus on posting buffers, requiring them to be flushed to keep this situation from causing problems.

If the buffer flushing rules are not written carefully, however, deadlock may occur. The rest of the PCI transaction ordering rules prevent the system buses from deadlocking when posting buffers must be flushed.

Referring to FIG. 1, it illustrates a block diagram showing the architecture commonly used in conventional personal computers. The subsystems, such as processor 11, cache 12 and system memory 14, are connected to I/O bus 18 through a bus bridge 13). The bus bridge 13 provides a path through which the processor 11 may directly access I/O devices 16 mapped anywhere in the memory or I/O address spaces. It also provides a path allowing I/O bus masters direct access to system memory 14. The bus bridge 13 may optionally include functions of data buffernng/posting and arbitration of I/O bus 18.

As far as a bus bridge is concerned, it is responsible for maintaining transaction ordering and avoiding deadlock. Maintaining transaction ordering is mainly to have a consistent view of data in a system with write posting being allowed. Since the memory write completes at the source before it actually completes at the intended destination, the master issuing this write transaction also sets the flag to indicate that the data is now valid for other masters to use. So it right be possible that a master, regardless of which bus the master resides, reads the flag and confines the data before it is actually written to the destination. The data coherence of the system is destroyed after a master reads the stale data.

As for the coherency concern, it is required to obey the ordering rule that the posted data must be written to the destination before other masters observe the valid flag and read the data. In other words, the posting buffers within the bus bridge must be flushed before the bus bridge performs a read transaction.

In addition to maintaining transaction ordering, the bus bridge should also avoid deadlock situations within the bridge. Deadlock situations typically require at least a temporary suspension of system operation, if not an entire system reset. A deadlock situation arises, for example, if the bridge contains two requests, one targeting an agent on the first bus and the second targeting an agent on the second bus, and neither request can be executed until the other is satisfied. Therefore, the deadlock prevents the bridge from operating properly.

In the existing X86 PC systems, a deadlock may occur if an I/O device makes acceptance of a memory write transaction as a target contingent on the prior completion of a memory writ e transaction as a master . If the prior write transaction initiated by the I/O master is destined for L2 cache 12/system memory 14, two deadlock situations may present in the system. One, the bus bridge 13 does not allow the I/O master to access L2 cache 12/system memory 14 by withholding the I/O bus 18 ownership from the requesting I/O master due to the posting buffers haven't been flushed. And then the posted transactions from the processor bus 17 to I/O bus 18 can not be executed at the destination due to the I/O device refuses to be a target while it can not perform a memory write first. The other, the bus bridge 13 can not hold the processor bus 17 because the processor bus 17 is stalled. There are two possible causes. First, the current outstanding transaction on processor bus 17 destined for I/O bus 18 is non-postable and waits for response until the transaction is completed on I/O bus 18. According to the ordering rule mentioned above, this non-posted transaction can not be executed on I/O bus 18 unless the posting buffers are flushed. Therefore, if some write transactions originating prior to the non-posted transaction on processor bus 17 have been posted in the posting buffers, the non-posted transaction queues up after them and stalls the processor bus 17. Second, the current outstanding transaction on processor bus 17 destined for I/O bus 18 is postable. And the processor bus 17 is stalled when the posting buffers are full such that the transaction can not be posted. As a result, the bus bridge 13 can not hold the processor bus 17 and execute the memory write requested by the I/O master, then the posted transactions in the posting buffers can not be executed on I/O bus 18 due to the I/O device 18 refuses to be a target.

In the prior X86 PC system, the I/O bus masters are allowed to access L2 cache 12/system memory 14 only after the bus bridge 13 holds and takes over the processor bus 17 while the posting buffers are flushed. During the period of being held, the processor 11 suspends the advanced outstanding transactions temporarily. Therefore, the bus bridge 13 can not promote system performance by having the write transactions moving in the opposite directions through the bridge executed concurrently. Furthermore, some deadlock situations may occur when the specific I/O devices 16 are resided on I/O bus 18, wherein the I/O devices 16 require making acceptance of a memory write transaction as a target contingent on the prior completion of a memory write transaction as a master.

Therefore, there is a need to provide a system which prevents the occurrence of deadlocks within the bus bridge, while at the same time performing bus transactions orderly and concurrently.

SUMMARY OF THE INVENTION

To overcome the aforementioned problems, it is an object of the present invention to provide a method and apparatus for performing bus transactions orderly and concurrently in a bus bridge, which is compliant with current personal computers.

It is another object of the present invention to provide a deadlock-free technique for supporting concurrent processing in a bus bridge compliant with highly pipelined processor bus, such as the Pentium II processor bus.

BRIEF DESCRIPTION OF THE DRAWINGS

For a more complete understanding of the present invention and the advantages thereof, reference is now made to the following descriptions taken in conjunction with the accompanying drawings which illustrate one or more embodiments of the present invention, wherein.

DETAILED DESCRIPTION OF THE PREFERRED EMBODIMENTS

Figure 1:
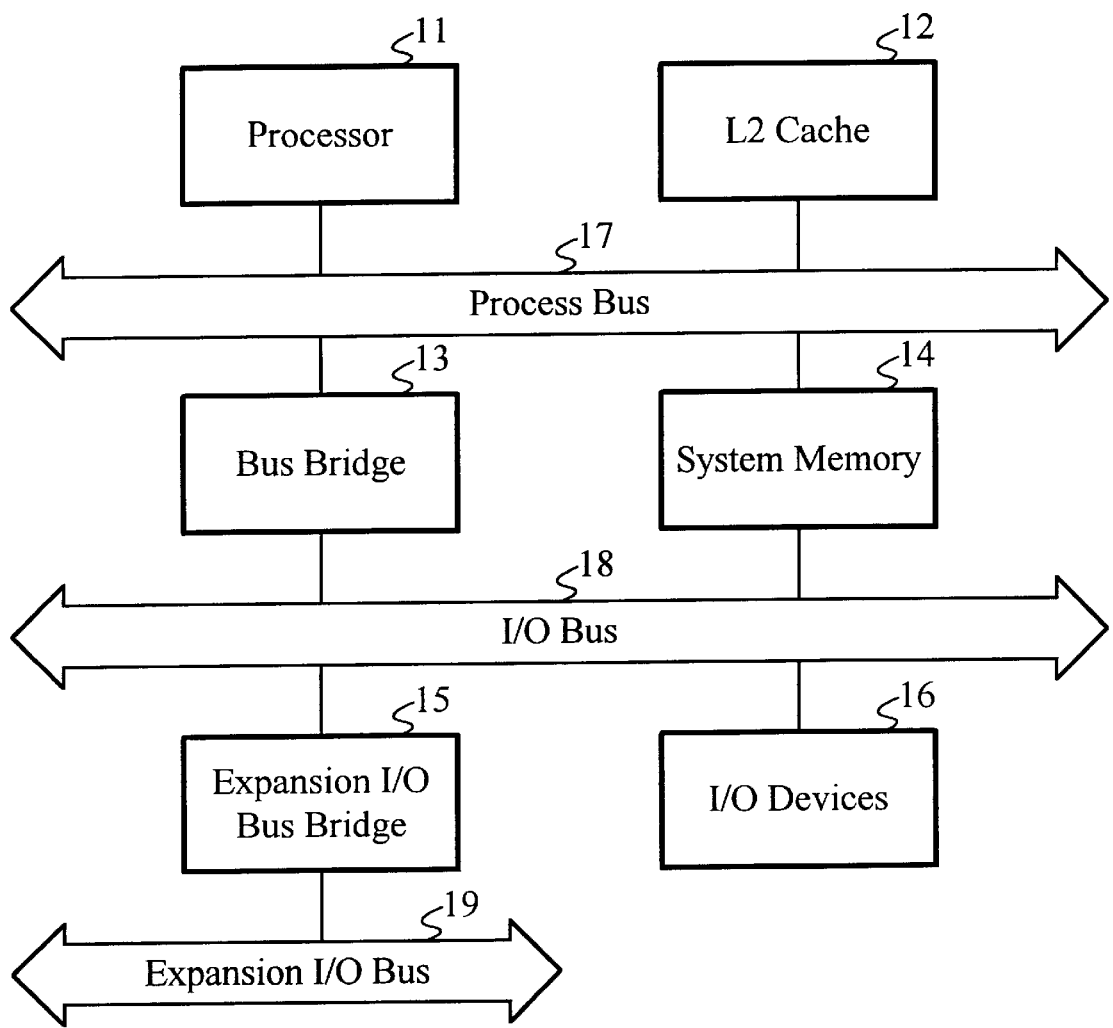
FIG. 1 illustrates a block diagram showing the architecture commonly used in conventional personal computers.
Figure 2:
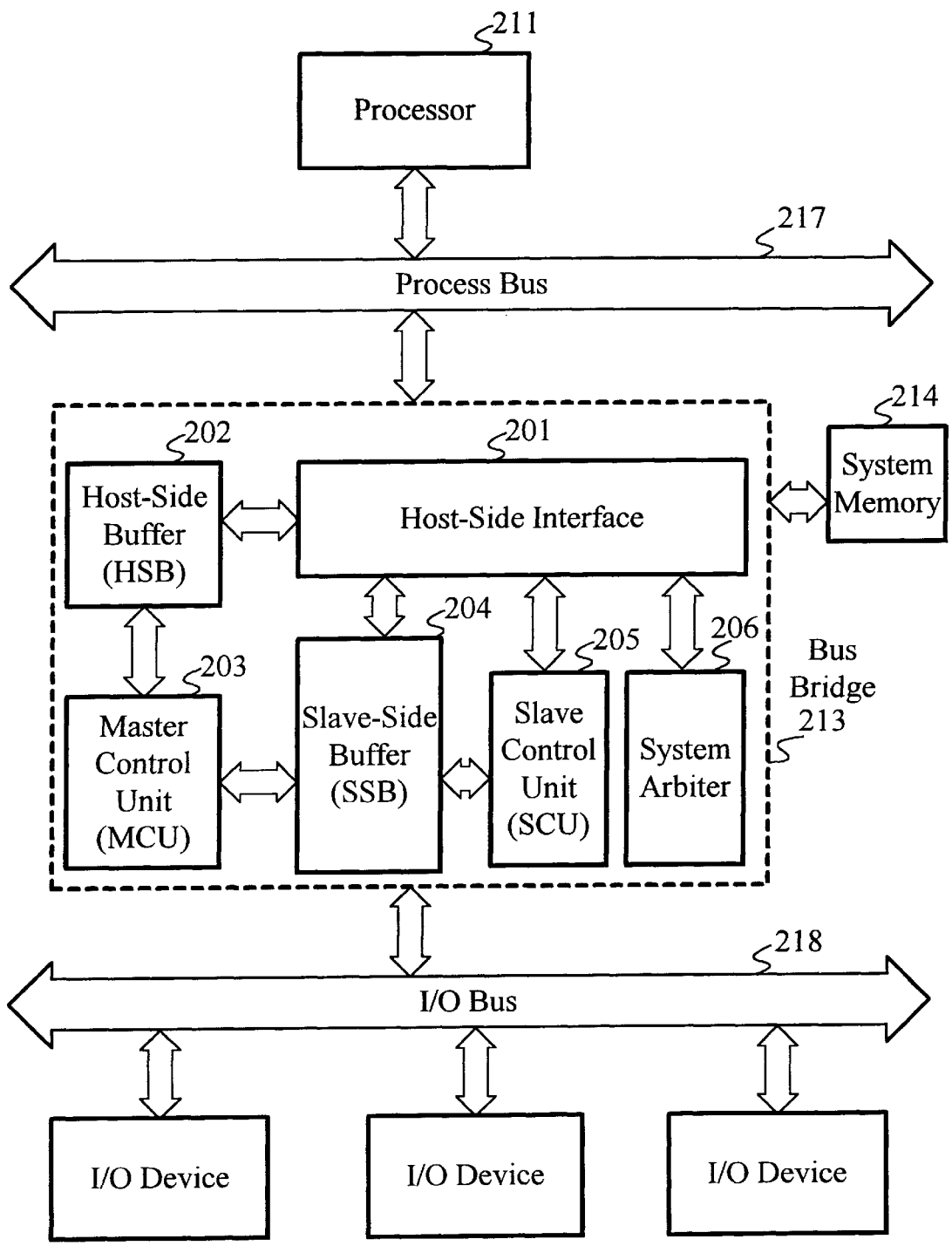
FIG. 2 illustrates an overview of an example computer system of the present invention.

Referring to FIG. 2, it illustrates an overview of an example computer system of the present invention. The computer system of the present invention generally comprises a processor 211 connected to a processor bus 217, a bus bridge 213 connected to the processor bus 217, a system memory 214 and an I/O bus 218, and I/O devices 216 connected to the I/O bus 218. The bus bridge 213 further comprises a Host-Side Interface (HSI) 201, a Host-Side Buffer (HSB) 202, a Master Control Unit (MICU) 203, a Slave-Side Buffer (SSB) 204, a Slave Control Unit (SCU) 205 and a System Arbiter (SA) 206. The Host-Side Interface (HSI) 201 is mainly designed for communicating with the processor 211 and compliance of highly pipelined processor bus protocol, such as Pentium II processor bus protocol. The Host-Side Buffer (HSB) 202 is capable of buffering and posting transactions from the processor bus 217 to the I/O bus 218, whereas the Slave-Side Buffer (SSB) 204 is capable of buffering and posting transactions from the I/O bus 218 to the processor bus 217. In addition, the Master Control Unit (MCU) 203 is responsible for executing transactions queued in the Host-Side Buffer (HSB) 202 toward the I/O bus 218 and the Slave Control Unit (SCU) 205 is designed for processing transactions queued in Slave-Side Buffer (SSB) 204 toward the processor bus 217. As for the System Arbiter (SA) 206, it is designed for arbitration of the I/O bus 218 and cooperating with the Host-Side Interface (HSI) 201 to maintain transaction ordering.

Figure 3:
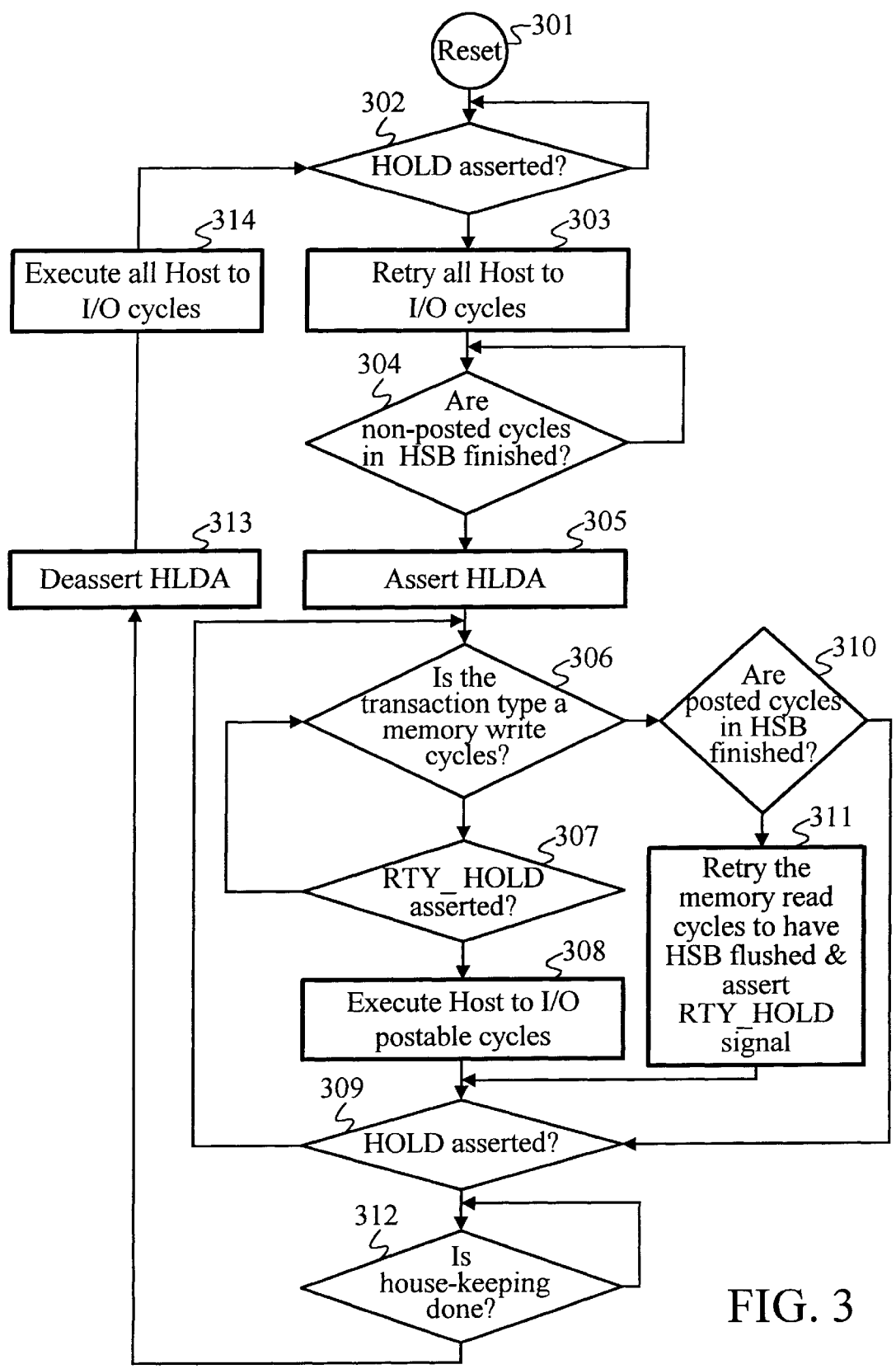
FIG. 3 illustrates a flow chart showing the operation of the bus bridge of the present invention.

Referring to FIG. 3, it illustrates a flow chart showing the operation of the bus bridge of the present invention. Upon receipt of a HOLD signal generated by the System Arbiter 206 (step 302), which indicates the intention of the I/O devices (agents) 216 on the I/O bus 218 to arbitrate for the ownership of the 1/O bus 218, the bus bridge 213 presumes the I/O devices 216 on the I/O bus 218 to initiate a request targeting the agent on the processor bus 217. Then the bus bridge 213 gives retry responses temporarily to those requests originating from the processor bus 217 and destined for the I/O bus 218 (step 303). That is, the requests regardless of postable or non-postable will not be placed in the HSB 202 any more after the SA 206 asserts a HOLD signal to have the HSB 202 flushed eventually. When the non-posted transactions placed in the HSB 202 before the HOLD signal is asserted are all executed on the I/O bus 218 (step 304), the bus bridge 213 asserts a HLDA (Hold Acknowledge) signal to the SA 206 to grant the I/O device 216 arbitrating the I/O bus 218 (step 305) to access the System Memory 214. Note that L2 cache (not shown) is included in the processor 211.

To execute the transactions in the HSB 202 toward the I/O bus 218, the MCU 203 keeps sending the request to the SA 206 to arbitrate for the I/O bus 218. For the non-posted transactions that the HSI 201 commits to the HSB 202 before the HOLD signal is asserted by the SA 206, the MCU 203 may return a completion or a retry response to the originating agent on the processor bus 217 depending on the execution result on the I/O bus 218. If a non-posted transaction is completed on the I/O bus 218, the MCU 203 responds to the agent waiting for the response on the processor bus 217. It should be noted that the MCU 203 is allowed to return retry responses until the second repeated transaction is also retried by the I/O bus 218. Once the MCU 203 finishes executing all non-posted transactions in the HSB 202 toward the I/O bus 218, the HSI 201 asserts a HLDA (Hold Acknowledge) signal to the SA 206 to grant the I/O device 216 arbitrating the I/O bus 218. On the other hand, if there is no non-posted transaction in the HSB 202 before the HOLD signal is asserted, the HSI 201 can immediately send a HLDA signal to the SA 206 even though the HSB 202 is filled with posted transactions. Meanwhile, the MCU 203 keeps executing the posted transactions in the HSB 202 toward the I/O bus 218. Because the response of the posted transaction has already returned to the originating agent on the processor bus 217, the MCU 203 attempts the execution until it is completed on the I/O bus 218.

Figure 4A:
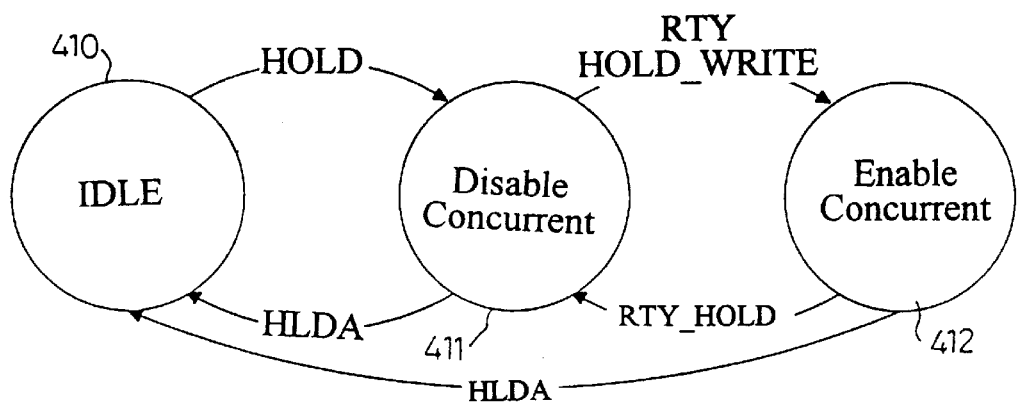
FIG. 4(a) illustrates a state diagram showing the relationship among idle, non-concurrent and concurrent states.

Returning to the HLDA signal, the SA 206 grants bus ownership to the requesting I/O device 216 when both HOLD and HLDA signals are asserted. Referring to FIG. 4(a), the bus bridge 213 is currently in Disable Concurrent state 411 preventing the HSI 201 from committing the transactions to the HSB 202 such that the ordering requirement "Host-side buffer must be flushed" for a read request from I/O device 216 can be satisfied eventually. And thus a read request from I/O device 216 will be completed on the processor bus 217 within fairer latency, which will be discussed in later paragraphs.

The bus bridge 213 then determines transaction types initiated by the I/O device 216 obtaining the I/O bus 218 ownership (step 306). If the transaction type is a memory write transaction from the I/O bus 218 and a previous RTY_HOLD (Retry Hold) signal is not asserted (step 307), the SCU 205 will claim this transaction and always post it in the SSB 204 if the transaction is destined for the processor bus 217 and there is available spaces in the SSB 204. Meanwhile, the HSI 201 is allowed to commit the postable requests originating on the processor bus 217 again and place them in the HSB 202. But the non-postable requests originating on the processor bus 217 and targeting on the I/O bus 218 are still retried by the HSI 201 until the HLDA signal is deasserted. The bus bridge 213 is now transferred to Enable Concurrent state 412 shown in FIG. 4(a) and operated concurrently in opposite directions (step 308) due to the transactions in both HSB 202 and SSB 204 are posted. Therefore, the concurrent processing is introduced to enhance performance. That is, the memory write transactions through the bus bridge 213 in opposite directions can be processed in parallel according to the ordering rule "write transactions crossing a bridge in opposite directions have no ordering relationship". The bus bridge 2113 thus allows the write transactions to pass through the bus bridge 213 in one direction held previously while it processes the write transaction initiated by the request agent in another direction.

If the transaction type is a memory read transaction from the I/O bus 218, a RTY_HOLD signal is utilized to disable the concurrent processing temporarily. According to the ordering rule "A read transaction must push ahead of it through the bridge any posted writes originating on the same side of the bridge and posted before the read. Before the read transaction can complete on its originating bus, it must pull out of the bridge any posted writes that originated on the opposite side and were posted before the read command completes on the read-destination bus,", the bus bridge must flush the posting buffers in either direction before it performs a read transaction from either direction. Therefore, disable concurrent processing makes the transaction flow hold again in the opposite direction of the read transaction such that the posting buffers on the opposite side of the read transaction will be empty soon. So, the read transaction can be executed once the posting buffers are empty. Therefore, the SCU 205 will claim this read transaction and attempt to execute the transaction on the processor bus 217 if the transaction is destined for the processor bus 217. Meanwhile, the bus bridge 213 still stays in Disable Concurrent state 411 and the HSI 201 keeps retrying all requests from the processor bus 217 to the I/O bus 218. Whether the SCU 205 keeps attempting to execute the read transaction on the processor bus 217 or gives a retry response directly to the requesting agent depends on whether the ordering requirement "HSB 202 must be flushed" is satisfied or not (step 310). The SCU 205 will retry the I/O device 216 initiating a read transaction if the HSB 311 has not been flushed yet and let the MCU 203 execute the inflated posted transactions on the I/O bus 218 as soon as possible (step 311). As a result, the retried read transaction is able to be executed on the processor bus 217 and therefore the SCU 205 returns a successful completion response to the I/O device 216 soon.

Figure 4B:
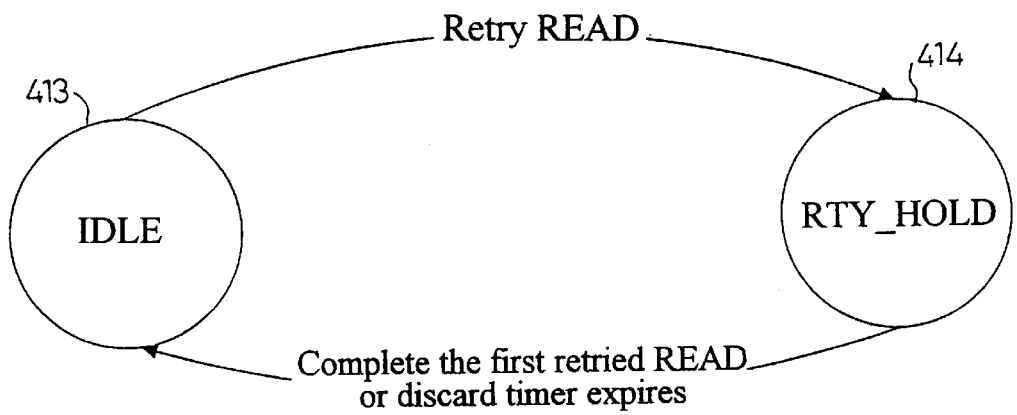
FIG. 4(b) illustrates a state diagram showing the relationship between the idle and concurrent states.

In order to maintain fairer latency for the read transactions originating on the I/O bus 218, the SCU 205 will assert a RTY_HOLD signal when the SCU 205 retries the read transaction due to the ordering requirements are not satisfied (step 311) and the bus bridge 213 will transfer to RTY_HOLD state 414 as shown in FIG. 4(b). Under the assertion of the RTY_HOLD signal, the bus bridge 213 will never enter in Enable Concurrent state 412 even if the SCU 205 commits the memory write transactions during this period. Disabling the concurrent mode, the HSI 201 retries all transactions from the processor bus 217 to the I/O bus 218 such that the HSB 202 will be flushed soon. And then the retried read transaction can be executed on the processor bus 217 within shorter latency.

Figure 4C:
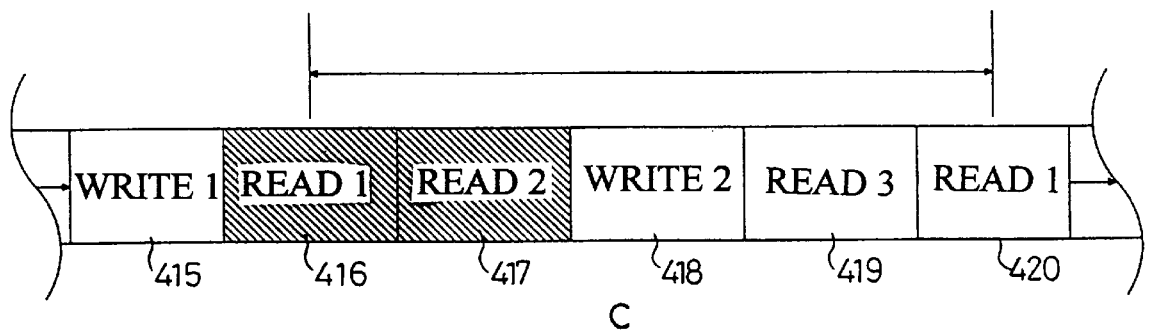
FIG. 4(c) illustrates the behavior of RTY_HOLD among the transaction streams on an I/O bus.

Furthermore, the SCU 205 will latch the address of the first retried read transaction and deassert the RTY_HOLD signal when the repeated read transaction with the same address as the latch one is completed on the I/O bus 218 and the bus bridge 213 will transfer to IDLE state 413 as shown in FIG. 4(b). The intention is to guarantee the retried read transaction can be performed within limits By preventing the HSI 201 from entering concurrent mode under the assertion of RTY_HOLD signal, the SCU 205 unclogs the path for the read transaction of the I/O device 216 and ensures the retried read transaction can be completed soon. Referring to FIG. 4(c), the SCU 205 always protects the first retried read transaction such as READ1 416 in the figure. Before the completion of repeated READ1 416, write transactions (like WRITE2 418) or other read transactions (like READ3 419) are allowed to be performed in advance. As for retried READ2 417, whether it will be completed before or after the completion of READ1 416, depends on whether the request of repeated READ2 417 is signaled earlier or later than the one of repeated READ1 416.

In this manner, the retried read transaction kept in the SCU 205 will be able to be performed and completed within a shorter period of time. But to avoid deadlock and degrade the concurrent performance if the retried read transaction is not repeated for a long time, the SCU 205 will deassert the RTY_HOLD signal when the discard timer (not shown) expires. The discard timer is programmable and can be programmed to a predetermined time (such as $2^{16}$ I/O bus clocks at most).

After the read/write transaction is completed, the bus bridge 213 checks whether the HOLD signal is still asserted (step 309). If the HOLD signal is still asserted, then step 306 is repeated. Otherwise, the bus bridge 213 executes the house-keeping work (step 312), i.e. flushes the prefetched transactions in the HSB 202 after the read transaction is completed or retires the postwrite transactions in the SSB 204 after the write transaction is completed. After the house-keeping work is done, the HLDA signal is deasserted (step 313) and all transactions from the processor bus 217 to the I/O bus 218 are allowed to be executed (step 314).

Through the mechanism mainly controlled by the HOLD, HLDA and RTY_HOLD signals, the maintenance of transaction ordering and concurrent processing are achieved in the bus bridge 213.

As to the deadlock avoidance, two deadlock situations may occur in the conventional bus bridge of the X86 PC systems. The deadlock may occur if an I/O device 216 makes acceptance of a memory write transaction as a target contingent on the prior completion of a memory write transaction as a master. In the first case, the bus bridge 213 does not allow the I/O device 216 to access system memory 214 by withholding the I/O bus 218 ownership from the requesting I/O device 216 due to the HSB 202 have not been flushed. And then the posted transactions from the processor bus 217 to the I/O bus 218 can not be executed at the destination due to the I/O device 216 refuses to be a target while it can not perform a memory write transaction first. This deadlock is solved because the HSI 201 asserts a HLDA signal after the nonposted transactions in the HSB 202 are all completed on the I/O bus 218. That is, the write transactions from the I/O device 216 to the system memory 214 are allowed to be executed while the MCU 203 attempts to execute the posted transactions in the HSB 202 on the I/O bus 218.

In the second case, the processor bus 217 is stalled by the current outstanding transaction destined for the I/O bus 218 for two possible reasons. First, the outstanding transaction on the processor bus 217 is non-postable. The processor 211 is stalled to wait for the response until the transaction is completed on the I/O bus 218. But according to the ordering, this non-posted transaction can not be executed on the I/O bus 218 if some write transactions originated prior to the non-posted transaction on the processor bus 217 have been posted in the HSB 202. Second, the outstanding transaction on the processor bus 217 is postable. The processor bus 217 is stalled when the HSB 202 is full such that the transaction can not be posted. Consequently, the bus bridge 213 can not hold the processor bus 217 to execute the memory write transaction requested by the I/O device 216, then the posted transactions in the HSB 202 can not be executed on the I/O bus 218 due to the I/O device 216 refuses to be a target. In order to avoid this deadlock situation, the HSI 201 does not commit the non-postable transactions to the HSB 202 temporarily if there is any posted transactions in the HSB 202, which have not been completed on the I/O bus 218. Meanwhile, the HSI 201 does not commit the postable transactions to the HSB 202 temporarily if the HSB 202 is not available to buffer the posted data. Such approaches of retrying the transactions from the processor bus 217 to the I/O bus 218 will prevent the processor bus 217 from being stalled under specific deadlock situations. Therefore, the deadlock avoidance is achieved through the approaches.

When the SCU 205 commits the postable transactions or receives a non-postable transaction for which the ordering requirements are satisfied, the HSI 201 attempts to execute them on the processor bus 217. And there is only one response, a successful completion response will be returned to the I/O device 216 initiating the transaction on the I/O bus 218. In the present invention, the transaction from the processor bus 217 to the system memory 214 is surely completed by a Host-DRAM Controller (not shown) in the HSI 201 regardless of originating from the processor 211 or the bus bridge 213 itself When a transaction is posted in the SSB 204, the transaction is completed on the I/O bus 218 and the SCU 205 will be responsible for retiring the posted data to the destination, i.e. the system memory 214. Besides, when the transaction is not posted, the SCU 205 may return a completion response or retry response to the I/O device 216 issuing the transaction on the I/O bus 218 depending on whether the HSB 202 is flushed or not. If the HSB 202 is flushed, the SCU 205 attempts the transaction on the processor bus 217 and certainly returns the successful completion to the I/O device 216 waiting for the response on the I/O bus 218. Otherwise, the SCU 205 gives the retry response directly to the I/O device 216 on the I/O bus 218. It should be emphasized that the SCU 205 always posts the memory write transactions on the I/O bus 218 to the SSB 204.

In summary, the bus bridge 213 of present invention preconsiders the ordering requirements and deadlock avoidance at the beginning phase when the I/O devices 216 on the I/O bus 218 arbitrate for the bus ownership. In addition, the bus bridge of the present invention adopts the mechanism mainly controlled by HOLD, HLDA and RTY_HOLD signals to perform the bus transaction orderly and concurrently. Therefore, the performance of the personal computer is enhanced. Furthermore, the bus bridge of the present invention utilizes some approaches to prevent the processor bus 217 from being stalled to avoid the deadlock which may occur in prior systems.

Although the present invention and its advantages have been described in detail, it should be understood that various changes, substitutions and alternations can be made herein without departing from the spirit and scope of the invention as defined by the appended claims.

What is claimed is:

1. A method for performing bus transactions orderly and concurrently in a bus bridge coupled to a first bus and a second bus, wherein at least one agent is coupled to the first bus and at least one agent is coupled to the second bus, the method comprising the steps of:
    (a) asserting a HOLD signal by a system arbiter for indicating that agents on the second bus arbitrate for the bus ownership;
    (b) retrying transactions from the first bus to the second bus;
    (c) flushing non-posted transactions in a host-side buffer;
    (d) asserting a HLDA signal by a host-side interface when the non-posted transactions in the host-side buffer are flushed;
    (e) granting the second bus ownership to one of the agents on the second bus;
    (f) determining transaction types initiated by the agent obtaining the second bus ownership;
    (g) stopping retrying postable transactions from the first bus to the second bus when the transaction type is a memory write transaction, or
    retrying transactions from the second bus to the first bus, if all posted transactions in the host-side buffer are not flushed, when the transaction type is a memory read transaction; and
    (h) transmitting a completion response to the agent obtaining the second bus ownership.

2. The method as claimed in claim 1, wherein the first bus is a processor bus.

3. The method as claimed in claim 1, wherein the second bus is an I/O bus.

4. The method as claimed in claim 1, wherein the second bus is a PCI bus.

5. The method as claimed in claim 1, wherein the agent coupled to the first bus is a processor.

6. The method as claimed in claim 1, wherein the agent coupled to the second bus is an I/O device.

7. The method as claimed in claim 1, wherein the step (g) further comprises the step of asserting a RTY_HOLD signal and latching the address of the first retried read transaction until the same memory read transaction is completed.

8. The method as claimed in claim 7, further comprising the step of deasserting the RTY_HOLD signal when the memory read transaction is completed.

9. The method as claimed in claim 7, further comprising the step of deasserting the RTY_HOLD signal after a predetermined time has been elapsed.

10. The method as claimed in claim 1, wherein the step (g) further comprises the step of checking whether a RTY_HOLD signal is asserted.

11. The method as claimed in claim 1, further comprising the step of checking whether the HOLD signal is still asserted.

12. The method as claimed in claim 1, further comprising the step of flushing prefetched transactions in the host-side buffer after the read transaction is completed.

13. The method as claimed in claim 1, further comprising the step of retiring postwrite transactions in a slave-side buffer after the write transaction is completed.

14. The method as claimed in claim 1, further comprising the step of deasserting the HLDA signal after the flushing step as claimed in claim 12 is done.

15. The method as claimed in claim 1, further comprising the step of deasserting the HLDA signal after the retiring step as claimed in claim 13 is done.

16. The method as claimed in claim 1, further comprising the step of retrying the non-postable transactions from the first bus to the second bus whenever there are postable transactions queued in the host-side buffer.

17. The method as claimed in claim 1, further comprising the step of retrying the postable transactions from the first bus to the second bus whenever the host-side buffer does not have sufficient spaces to buffer the transaction data.

18. A bus bridge coupled between a first bus and a second bus, wherein at least one agent is coupled to the first bus and at least one agent is coupled to the second bus, the bus bridge comprising:

a host-side interface for communicating between the first bus and the second bus;

a host-side buffer for buffering and posting transactions from the first bus to the second bus;

a slave-side buffer for buffering and posting transactions from the second bus to the first bus;

a master control unit for processing the transactions buffered in the hostside buffer toward the second bus;

a slave control unit for processing the transactions buffered in the slaveside buffer toward the first bus; and a system arbiter for arbitrating the second bus and cooperating with the host-side interface to maintain transaction ordering.

19. The bus bridge as claimed in claim 18, wherein the first bus is a processor bus.

20. The bus bridge as claimed in claim 18, wherein the second bus is an I/O bus.

21. The bus bridge as claimed in claim 18, wherein the second bus is a PCI bus.

22. The bus bridge as claimed in claim 18, wherein the agent coupled to the first bus is a processor.

23. The bus bridge as claimed in claim 18, wherein the agent coupled to the second bus is an I/O device.

24. A computer system comprising:

a first agent coupled to a first bus;

a second agent coupled to a second bus;

a bus bridge coupled between the first bus and the second bus, the bus bridge comprising:

a host-side interface for communicating between the first bus and the second bus;

a host-side buffer for buffering and posting transactions from the first bus to the second bus;

a slave-side buffer for buffering and posting transactions from the second bus to the first bus;

a master control unit for processing the transactions buffered in the hostside buffer toward the second bus;

a slave control unit for processing the transactions buffered in the slaveside buffer toward the first bus;

a system arbiter for arbitrating the second bus and cooperating with the host-side interface to maintain transaction ordering; and a system memory coupled to the bus bridge for data storage;

wherein the first bus transfers data between the first agent and the first bus and the second bus transfers data between the second agent and the second bus.

25. The system as claimed in claim 24, wherein the first bus is a processor bus.

26. The system as claimed in claim 24, wherein the second bus is an I/O bus.

27. The system as claimed in claim 24, wherein the second bus is a PCI bus.

28. The system as claimed in claim 24, wherein the agent coupled to the first bus is a processor.

29. The system as claimed in claim 24, wherein the agent coupled to the second bus is an I/O device.

* * * * *